United States Patent [19]

Ishida et al.

[11] Patent Number: 4,717,223

[45] Date of Patent: Jan. 5, 1988

[54] OPTICAL DEFLECTOR

[75] Inventors: Takao Ishida, Kawasaki; Kenichi Tsuneeda, Yokohama, both of Japan

[73] Assignee: Kabushiki Kaisha Toshiba, Kawasaki, Japan

[21] Appl. No.: 933,359

[22] Filed: Nov. 19, 1986

Related U.S. Application Data

[63] Continuation of Ser. No. 735,985, May 20, 1985, abandoned.

[30] Foreign Application Priority Data

May 21, 1984 [JP] Japan .................. 59-102038

[51] Int. Cl.$^4$ .............................................. G02B 26/10
[52] U.S. Cl. ......................................................... 350/6.8
[58] Field of Search ........................... 350/6.1–6.3, 350/6.5, 6.7, 6.8

[56] References Cited

U.S. PATENT DOCUMENTS

| | | | |
|---|---|---|---|
| 4,512,626 | 4/1985 | Kamiya et al. ............... | 350/6.8 |
| 4,523,800 | 6/1985 | Yamashita et al. ........... | 350/6.7 |

FOREIGN PATENT DOCUMENTS

| | | | |
|---|---|---|---|
| 0109917 | 7/1982 | Japan ........................... | 350/6.8 |
| 0044415 | 3/1983 | Japan ........................... | 350/6.8 |
| 0049516 | 3/1984 | Japan ........................... | 350/6.8 |

*Primary Examiner*—John K. Corbin
*Assistant Examiner*—Loha Ben
*Attorney, Agent, or Firm*—Schwartz, Jeffery, Schwaab, Mack, Blumenthal, Evans

[57] ABSTRACT

In an optical deflector of a polygonal mirror type, a cylinder rotatably overlaps on a fixed shaft with a gap between them. The cylinder rotates the polygonal mirror therewith. The cylinder is radially supported by a journal bearing of dynamic pressure type and axially suspended by a magnetic thrust bearing. The cylinder and the fixed shaft are made of nonmagnetic material, so that the cylinder is prevented from eccentric rotation because of local magnetization of cylinder and the shaft.

2 Claims, 2 Drawing Figures

OPTICAL DEFLECTOR

This application is a continuation of application Ser. No. 735,985, now abandoned, filed May 20, 1985.

BACKGROUND OF THE INVENTION

This invention relates to an optical deflector used for a laser beam printer.

In general, an optical deflector is provided with a motor to rotate a polygonal mirror for deflecting a laser beam emitted by a laser generating device sush as a semiconductor laser diode. In such a motor, friction between a motor shaft and bearings needs be minimized for high speed rotation. To meet this requirement, the motor shaft is radially supported by journal bearings of a dynamic pressure type, and is floated or suspended to be axially supported by a magnetic thrust bearing.

In the motor mentioned above, air is introduced into a gap of 3 $\mu$m to 6 $\mu$m between the bearing member of dynamic journal bearings of herringbone type through herringbone grooves. As a result, a bearing pressure within the gap is increased at the center portion of the bearings, so that the motor shaft is subjected to a radial force. The motor shaft is suspended in a position in which the thrust load and the magnetic force of the thrust bearing are balanced. This rotary mechanism with the axial bearings and the thrust bearing permits the motor to rotate at high speeds in the range of 4,000 rpm to 15,000 rpm.

In a conventional arrangement of this type, however, the motor shaft is liable to be magnetized in the machining process and allow ingress of iron particles which may interfere with the preferable rotation of the motor shaft. When the shaft is locally magnetized, the shaft suspended by the magnetic thrust bearing is effected by the local magnetization. The local magnetization causes relative eccentricity of the shaft against the journal bearings which may result in contact of the shaft and the bearings, and faulty rotation.

SUMMARY OF THE INVENTION

Accordingly, it is an object of the present invention to provide an optical deflector which may maintain stable rotation of a polygonal mirror over extended periods of time.

Another object of the present invention is to provide an optical deflector which prevents ingress of magnetic particles and eccentric rotation.

These and other objects are achieved by providing a novel optical deflector with a polygonal mirror for deflecting a light beam including a supporting shaft made of nonmagnetic material, a cylindrical shaft made of nonmagnetic material and rotatably overlapped on the supporting shaft with a gap between the supporting shaft and the cylindrical shaft and for supporting and rotating the polygonal mirror so that a light beam reflected by the polygonal mirror is deflected, a journal bearing fixed to the supporting shaft for rotatably supporting the cylindrical shaft, and a magnetic thrust bearing for axially suspending the cylindrical shaft by means of magnetic force.

BRIEF DESCRIPTION OF THE DRAWINGS

These and other objects and advantages of the invention will become more apparent and more readily appreciated from the following detailed description of the preferred embodiments of the invention taken in conjunction with the accompanying drawings, of which.

DETAILED DESCRIPTION OF THE PREFERRED EMBODIMENTS

Figure 1:
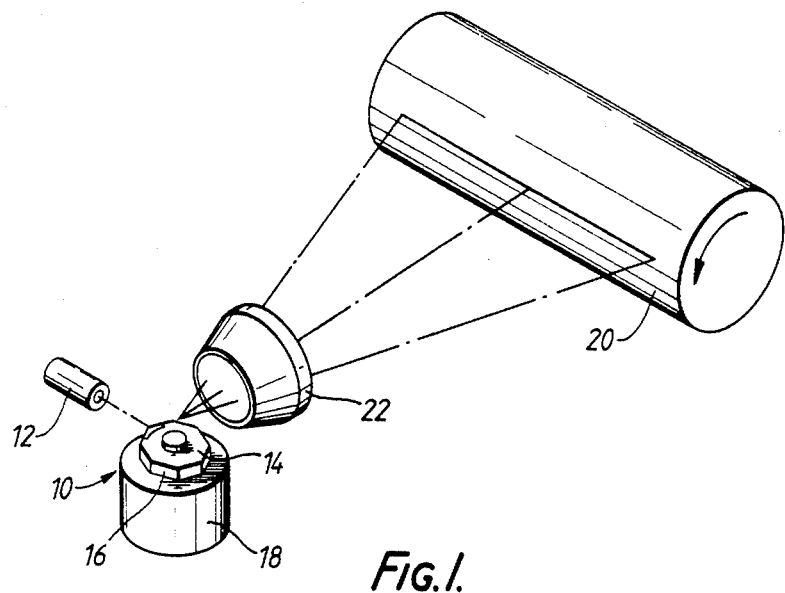
FIG. 1 is a schematic view of a laser beam printer including an optical deflector of a polygonal mirror type according to the present invention.

FIG. 1 is a schematic view of a laser beam printer including an optical deflector 10 incorporating the present invention.

Referring to FIG. 1, a laser beam modulated in intensity by image information is emitted by a laser unti 12, such as a semiconductor laser diode, to optical deflector 10. Optical deflector 10 is provided with a polygonal mirror 14 having, for example, eight light reflecting surfaces 16, and a motor 18 to rotate polygonal mirror 14. Polygonal mirror 14 is rotated rapidly by motor 18, so that the laser beam reflected by light reflecting surfaces 16 of polygonal mirror 14 is deflected within a certain spread angle. The deflected laser beam is directed to an electrophotographic photosensitive drum 20 through a lens unit 22. Thus, drum 20 is scanned with the deflected laser beam, and a latent image is formed on the surface of drum 20. Lens unit 22 compensates the focal plane of the laser beam deflected by polygonal mirror 14, so that the focused laser beam generates a plane in the direction of scanning. Motor 18 rotates polygonal mirror 14 at a high speed in a predetermined direction, for example, clockwise in a plan view.

Figure 2:
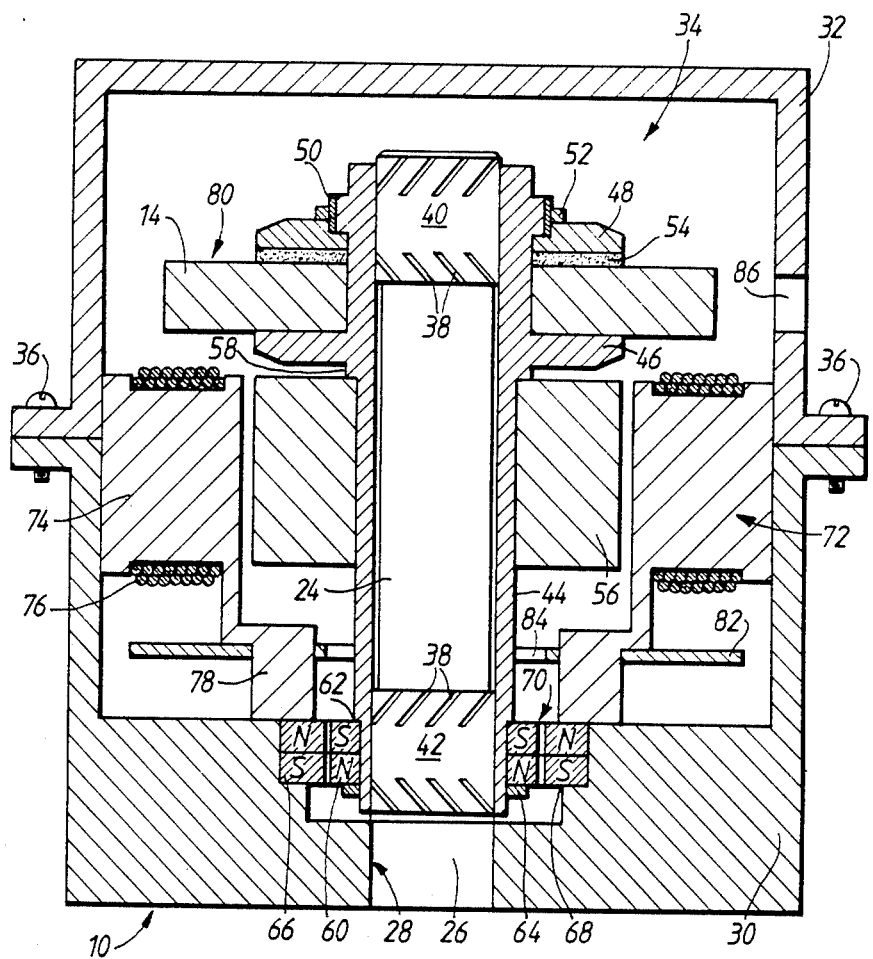
FIG. 2 is a sectional view of the optical deflector.

Referring to FIG. 2, optical deflector 10 is provided with a fixed shaft 24. A lower end 26 of fixed shaft 24 is secured in a fixing portion 28 of a lower housing 30 by means of shrink fitting. An upper housing 32 is fastened with lower housing 30 so as to close the upper opening of housing 30 and composes a container 34 together with lower housing 30. These housings 30 and 32 are attached to each other by screws 36.

Fixed shaft 24 is made of nonmagnetic material, such as nonmagnetic cemented carbide (for example, FUJIL-LOY M50 manufactured by FUJI DICE Inc.). Herringbone grooves 38 are formed on the peripherial surfaces of the upper and bottom portions of fixed shaft 24. Inclined grooves 38 are inclined toward the direction of the rotation of polygonal mirror 14 to form journal bearings 40 and 42 of a dynamic pressure type.

A hollow cylinder 44 is rotatably fitted on fixed shaft 24. This cylinder 44 is made of nonmagnetic material, such as non-magnetic cemented carbide (for example the above-mentioned FUJILLOY M50). Cylinder 44 overlaps journal bearings 40 and 42 with a gap of 3 $\mu$m to 6 $\mu$m between the inner surface of cylinder 44 and the outer surfaces of bearings 40 and 42 of shaft 24.

Polygonal mirror 14 is fitted on cylinder 44 so that the lower surface of mirror 14 abuts against an upper surface of a collar 46 projecting out slightly above vertical center of cylinder 44. Polygonal mirror 14 also is held between collar 46 and clamp 48 mounted on a threaded section 50 of cylinder 44, and is fixed by tightening a nut 52 which is screwed on threaded section 50. An elastic sheet 54 is placed between the lower surface of clamp 48 and the upper surface of polygonal mirror 14, so that polygonal mirror 14 is urged to collar 46 by tightening nut 52.

Also, a motor rotor 56 is fitted on cylinder 44 so that it abuts against a rib 58 provided at the lower surface of collar 46.

Inner magnetic rings 60 are fitted on the bottom portion of cylidner 44 and securely held between a shoulder 62 of cylinder 44 and a fastening ring 64 fitted to the bottom portion of cylinder 44. These rings 60 are composed fo annular permanent magnets having an inver peripheral surface coaxially fixed to cylinder 44 and an outer peripheral surface with magnetic poles. The outer peripheral surfaces of rings 60 are magnetized with south and north poles. Outer magnetic rings 66 are securely fitted to a stepped recess 68 provided on the bottom section of lower housing 30. These rings 66 are composed of annular permanent magnets having an inner peripheral surface coaxially opposed to the outer peripheral surface of rings 60 across a gap and an outer peripheral surface fixed to recess 68. The inner peripheral surfaces of rings 66 are magnetized with north and south poles in a pattern which is magnetically inverted from the poles on the outer peripheral surface of rings 60 so as to produce the attractive magnetic force between rings 60 and 66. Rings 60 and 66 constitute a magnetic thrust bearing 70 which supports cylinder 44 conjoining polygonal mirror 14 and motor rotor 56.

This magnetic thrust bearing 70 may advantageously take the form of that disclosed in copending application Ser. No. 735,984, now U.S. Pat. No. 4,607,908, filed by the current inventors on the same day as this application.

A motor stator 72 is installed on lower housing 30 to surround motor rotor 56 in a circle. This stator 72 is provided with a yoke 74 and a coil 76 wound about yoke 74. This yoke 74 is supported by stud 78. Stud 78 is fixed to the bottom section of lower housing 30. Motor stator 72 is so designed as to produce a magnetic field to rotate a rotor assembly 80 comprising cylinder 44, motor rotor 56 and polygonal mirror 14. Further, motor stator 72 is provided with a driving circuit board 82 which is electrically connected to driving coil 76. The surfaces of coil 76 and circuit board 82 are covered with insulating varnish film. A hole 84 provided in board 82 has a large diameter than the outer diameter of rings 60, so that cylinder 44 with inner magnetic rings 60 is freely insertably into hole 84.

Motor housings 30 and 32 are sealed up, for example, with silicone compound, to make vessel 34 completely airtight. Thus, polygonal mirror 14 and motor 18 are enclosed within tightly sealed vessel 34, which is filled with clean air. As cylinder 44 rotates at high speed, the inside of vessel 34 must be filled with clean air free from any dust, dirt and moisture. This enclosed construction prevents the ingress of dust, dirt and moisute, and so keeps air in vessel 34 dry and clean. This prevents locking of motor 18, corrosion of polygonal mirror 14 and rusting of other portions.

Upper housing 32 has a transmission hole section 86 to which the reflected laser beam is led.

In the optical deflector of a polygonal mirror type described above, when electric power is supplied to motor driving coil 76 of motor stator 72, a rotating magnetic field is established in motor stator 72 to drive rotor assembly 80 clockwise. The rotation of rotor assembly 80 introduces an air flow into the gap between fixed shaft 24 and cylinder 44 by the operation of herringbone grooves 38. The air flow produces a radial air pressure and forms air dynamic journal bearings 40 and 42. Thus, the presence inside the infinitesimal gaps, especially the pressure at the regions over the central portions of bearings 40 and 42 is increased, so that cylinder 44 is subject to a radial force and supported by the pressure inside the gaps.

In magnetic thrust bearing 70, inner and outer magnetic rings 60 and 66 attract one another. Namely, the pattern of opposite south and north poles on the outer surface of inner magnet rings 60 attract the pattern of opposite north and south poles on the inner surface of outer magnet rings 66, respectively. Thus, inner magnetic rings 60 are located in a balanced position which depends on the attractive magnetic force between magnetic rings 60 and 66 and the weight of rotor assembly 80, so that cylinder 44 is kept suspended.

Therefore, rotor assembly 80 is contactlessly supported against fixed shaft 22, and stable high speed rotation of assembly 80 is assured.

Thus, polygonal mirror 14 rotates in the high speed and deflects the laser beam emitted from laser unit 12. The deflected laser beam is led to the surface of drum 20 through hole 86 and lens unit 22, and scanned to form electrostatic latent images.

Supporting shaft 24 and cylinder 44 are made of nonmagnetic material, so that these components are not magnetized. Moreover, even if any iron particles are floating in vessel 34, they will not adhere in the gap between shaft 24 and cylinder 44. Cylinder 44 is surely prevented from eccentric rotation because of locally magnetized shaft 24 and cylinder 44.

Obviously, many modifications and variations of the present invention are possible in the light of the above teachings. It is, therefore, to be understood that within the scope of the appended claims, the invention may be practiced otherwise than as specifically described.

What is claimed is:

1. An optical deflector with a polygonal mirror for deflecting a light beam comprising:
    a fixed supporting shaft of nonmagnetic cemented carbide, said fixed supporting shaft having inclined grooves on the peripheral surfaces of upper and bottom portions of said fixed supporting shaft;
    a hollow cylindrical shaft of nonmagnetic cemented carbide, rotatably and coaxially overlapping said fixed supporting shaft with a gap between the peripheral surfaces of the upper and bottom portions of said fixed supporting shaft and the inner surface of said hollow cylindrical shaft thereby defining journal bearings of a dynamic pressure type, for supporting and rotating the polygonal mirror so that a light beam reflected by thè polygonal mirror is deflected without relative eccentricity of said cylindrical shaft, said journal bearings rotatably supporting said cylindrical shaft by flowing air into the gap;
    a magnetic thrust bearing for axially suspending said cylindrical shaft, said magnetic thrust bearing comprising a first magnetic member disposed on the peripheral surface of the bottom portion of said cylindrical shaft and a second magnetic member for producing an attractive magnetic force between said first and second magnetic members;
    a rotor fixed on said cylindrical shaft; and
    a stator, disposed coaxially with said rotor, for rotating said cylindrical shaft magnetically cooperating with said rotor.

2. An optical deflector according to claim 1, wherein said journal bearing is a dynamic pressure bearing of a herringbone type.

* * * * *